Feb. 26, 1963   D. HOFMANN, JR   3,078,720
APPARATUS FOR BALANCING VEHICLE WHEELS
Filed Feb. 1, 1960   3 Sheets-Sheet 1

INVENTOR
Dionys Hofmann, Jr.

By
Stevens, Davis, Miller & Mosher
ATTORNEYS

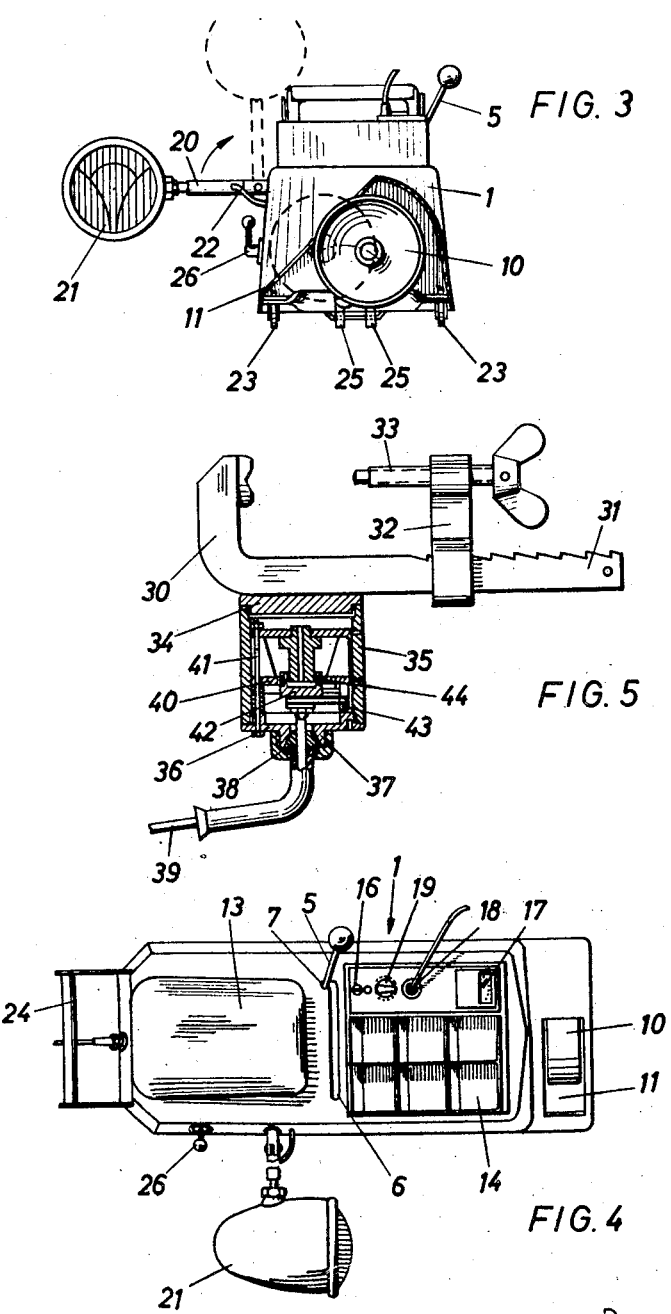

Feb. 26, 1963  D. HOFMANN, JR  3,078,720
APPARATUS FOR BALANCING VEHICLE WHEELS
Filed Feb. 1, 1960  3 Sheets-Sheet 3

INVENTOR
Dionys Hofmann, Jr.
By
Stevens, Davis, Miller & Mosher
ATTORNEYS

United States Patent Office 3,078,720
Patented Feb. 26, 1963

3,078,720
APPARATUS FOR BALANCING
VEHICLE WHEELS
Dionys Hofmann, Jr., Darmstadt, Germany, assignor to Gebrüder Hofmann K.G. Maschinenfabrik, Darmstadt, Germany
Filed Feb. 1, 1960, Ser. No. 5,957
8 Claims. (Cl. 73—457)

The invention relates to apparatus for determining the out-of-balance of a wheel on a jacked-up vehicle wherein the wheel is brought, by means of a friction roller, to a speed of rotation corresponding to a specific speed of travel and wherein stroboscopic flashes of light are produced through an electronic measuring device by means of an electro-mechanical transducer which receives the vibration of the wheel suspension.

The balancing of motor-vehicle wheels on stationary balancing machines involves a certain amount of labor and time because the wheels have to be removed from the vehicle, lifted onto the shaft of the balancing machine, secured to this, removed from the balancing machine again after the out-of-balance has been adjusted and secured to the motor vehicle. This labor is particularly arduous with heavy wheels for motor lorries. Accordingly, it has been proposed that the wheels should be checked directly on the jacked-up vehicle. This method is also useful, particularly in so far as it is a question of finding out whether a wheel has, in fact, any appreciable out-of-balance or when minor out-of-balance of the wheel is to be adjusted in order to obtain the quietest possible running thereof. In many cases, it may also be to the purpose to re-check wheels which have already been balanced on a stationary balancing machine, after they have been secured to the motor vehicle, and if necessary to re-adjust them, because the fixing means on the brake drum of the motor vehicle frequently do not correspond exactly to the fixing means on the balancing machine or because there may be out-of-balance in the brake drums.

The known devices for finding the out-of-balance of motor-vehicle wheels on a jacked-up vehicle work substantially by the following method:

The motor vehicle is raised, for example by means of a hydraulic jack. An electro-mechanical transducer is introduced between the ground or another fixed base and the suspension of the motor vehicle. A first attendant now drives up a so-called wheel-turner, which generally consists of an electric motor and a friction roller, for example to the front of the motor vehicle in the event of out-of-balance of one of the front wheels of the motor vehicle, and brings the wheel to a high speed of rotation by pressing the friction roller against the tire of the motor vehicle. Another attendant crouches down in front of the vehicle wheel which he illuminates with a stroboscope lamp which is connected to the electro-mechanical transducer through an amplifier and a pulse generator. A marking strip, which has been previously provided on the motor vehicle wheel, will now appear to stop at a certain point, from which the angular position of the out-of-balance is determined. The amplitude of the out-of-balance is read off at an amplitude indicating instrument which is connected to the amplifier. The vehicle wheel is now braked and a balance weight of appropriate size is inserted in the appropriate angular position. This procedure is then repeated until the residual out-of-balance lies within tolerable limits.

In other words, with the known devices, it is necessary to expend a comparatively large amount of time and labor because two attendants have to carry out a number of test runs. Since the attendant holding the stroboscope lamp is in a crouching position, rest intervals have to allowed in the work from time to time when motor-vehicle wheels are balanced on a large scale, for example, in large repair workshops. Furthermore, the attendant operating the wheel-turner is troubled by particles of dirt flying off the vehicle wheel. The balancing weights are often not secured sufficiently reliably during the test runs because their angular position and size may still have to be varied. The attendant operating the wheel-turner may therefore be in serious danger from dislodged balancing weights.

The method of using the apparatus of the invention consists essentially of driving the motor-vehicle wheel in one direction of rotation during a first test run and in the opposite direction of rotation during a second test run, the bisector of the angle subtended at the center of the wheel by the two points found at which a mark provided on the vehicle wheel appears to remain still under the stroboscopic flashes of light serves as a reference line for the insertion of balancing weights.

After the test runs, the vehicle wheel is turned, preferably by hand, until the mark is at the point at which it appeared to stand still during the first test run. The vertical point above the center of the vehicle wheel is marked. Then the wheel is turned until the mark is at the point at which it appeared to stand still in the second test run after which the vertical point above the center of the wheel is again marked. Thereafter the balancing weight is inserted on the bisector of the angle subtended at the center of the wheel by the two marks.

The present invention provides apparatus by means of which a single operator can effect the balancing of motor-vehicle wheels on a jacked-up vehicle in a considerably shorter time.

In the device according to the present invention, a friction roller which is adapted for rotation in both directions is pivotally mounted, with the driving motor, in a housing which affords a seat for the operator and which carries the stroboscope lamp and the measuring device with the indicator means.

In contrast to stationary balancing machines, the oscillating system formed by the suspension and possibly the control members, has a certain damping which may be different depending on the type of motor vehicle and on the condition thereof. According to the oscillation equation, therefore, the phase angle between the force exciting the oscillation and the out-of-balance oscillations will likewise be different. The necessity for a relatively large number of test runs in the known devices is attributable to this. Since, according to the present invention, the friction roller is adapted for rotation in both directions, the vehicle wheel can be driven first in one direction and then in the other direction (clockwise/counterclockwise). The out-of-balance then lies precisely in the center between the points found when running clockwise and counterclockwise.

According to a preferred embodiment, the stroboscope lamp is secured to the housing laterally through a boom. The optical axis of the beam of light from the lamp runs parallel to the shaft of the friction roller and of the driving motor seen in the direction of view of the operator sitting on the housing. The boom is preferably pivotable so that the stroboscope lamp can be swung into a recess or bay in the housing.

Preferably arranged in the middle of the housing is a lever which is pivotable transversely in relation to the longitudinal axis thereof and by means of which the friction roller can be swung transversely out of the housing to press against the vehicle tire. On one half of the top of the housing, behind the rocking lever, is a seat for the operator, on the other half, in front of the rocking lever, there is mounted an indicator and switch board together with a set of pigeonholes to receive the balancing weights. The seat is preferably hinged. It then forms a cover for a tool-box let into the housing.

According to a preferred embodiment, the friction roller is mounted directly on the shaft of the motor. The motor is rigidly connected, through a spacer, to a rod which is situated lower down and which can be rotated by means of the rocking lever. The motor is preferably accommodated in the front portion of the housing underneath the set of pigeonholes and the indicator board. In order to obtain accurate measuring results, the motor should be a three-phase synchronous motor. The speed of the motor should be adapted to the diameter of the friction roller in such a manner that each vehicle wheel is driven at a speed of rotation corresponding to a speed of travel at about 130 km./h.

A reversing switch is preferably provided to change the direction of rotation of the motor (clockwise/counterclockwise).

In order that the equipment may be brought quickly up to the vehicle wheel, it is preferably of mobile construction. For this purpose, travelling rollers, the axis of rotation of which runs at right angles to the axis of rotation of the friction roller, are provided on the housing underneath the friction roller and jacks are provided underneath the seat so that the device remains immovable in its operating position under the weight of the motor and of the operator sitting on the housing but can be transported on the rollers by raising by means of a handle provided on the rear wall of the housing.

The indicator board preferably comprises an instrument for indicating the extent of out-of-balance, which instrument can be adapted, by means of a rotary knob, to vehicle wheels of various sizes, and a connection for an electro-mechanical transducer. The indicator board is preferably mounted free of oscillation on a bed of sponge rubber or another damping base.

In the known devices in which the electro-mechanical transducer is supported on the one hand on the ground or on another fixed base and on the other hand on a part of the suspension for the vehicle wheel, it may happen that the transducer is destroyed if the jack yields at all. This occurs, in particular, with hydraulic lifting means. In order to avoid this, the electro-mechanical transducer is secured, according to the present invention, to a clamp which consists of an L-shaped bracket with teeth and a clamping section, which is displaceable on the teeth, with a set-screw. The electro-mechanical transducer works on the seismic recording principle. The springing of the oscillating body of the transducer is so hard that the natural resonance thereof is above 50 cycles/sec.

A preferred embodiment of the subject of the present invention is illustrated in the accompanying drawings.

FIG. 3 shows a front view of the device, partially in section;

FIG. 4 shows a plan view of the device;

FIG. 5 shows a view of the electro-mechanical transducer with the fixing clamp, partially in section;

Figure 1:
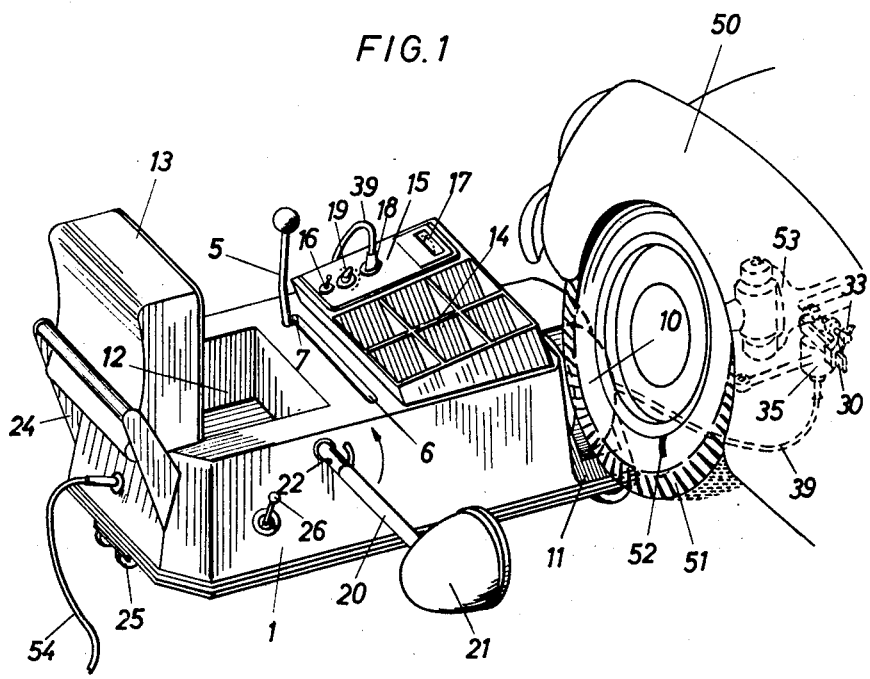
FIG. 1 shows a perspective view of the device according to the invention with the seat raised.
Figure 2:
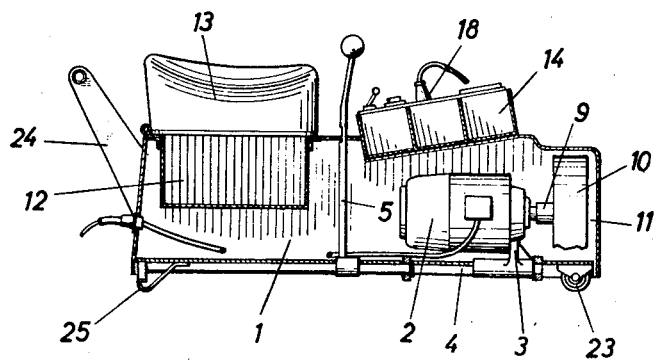
FIG. 2 shows a longitudinal section through the device.

A motor 2, which is preferably a three-phase motor independent of the load, is accommodated in a substantially square housing 1. The motor 2 is rigidly connected, through a spacer 3, to a bar 4 which is pivotally mounted in the housing 1. Mounted on the bar 4 is a rocking lever 5 which passes through a transverse slot 6 in the top of the housing 1. The slot 6 comprises a notch 7 into which the rocking lever 5 can drop in its position of rest.

Mounted on the shaft 9 of the motor is a friction roller 10. When the rocking lever 5 is swung towards the right in the sense of the illustration in the drawings, this rocking movement is transmitted through the bar 4 to the motor 2 so that the friction roller 10 is swung out of a slot 11 in the housing 1. The weight of the motor reinforces this rocking movement.

The motor 2 and the friction roller 10 are accommodated in the front portion of the housing 1. In the rear portion of the housing 1 is a tool box 12 which is covered by a hinged seat 13 for the operator. Let into the housing 1 above the motor 2 is a set of pigeonholes 14 which receives balancing weights, graded in various sizes. At the edge of the set of pigeonholes 14 is an indicator board 15 which is mounted free of oscillation on a sponge-rubber bed or another damping base. The indicator board 15 contains a main switch 16, an amplitude indicating instrument 17, a connection 18 for the electro-mechanical transducer illustrated in FIG. 5 and a rotary knob 19 by means of which the amplitude-indicating instrument 17 can be adapted to various types of motor vehicle.

Secured to one side wall of the housing 1 through a boom 20 is a stroboscope lamp 21. The boom 20 comprises a hinged joint 22 so that the stroboscope lamp 21 can be swung out of the way during transport of the apparatus.

Mounted on the housing 1 below the friction roller 10 are travelling rollers 23. At the back of the housing 1 is a handle 24. Furthermore, supports 25 are secured to the housing 1 underneath the seat 13. Accordingly, when the apparatus is raised by means of the handle 24, which does not require any great expenditure of energy, because the motor 2 is in the vicinity of the travelling rollers 23, the apparatus can be transported as desired. In the operating condition, however, the fact that the weight of the operator sitting on the seat 13 is above the supports 25 and the fact that the travelling rollers 23 have their axes perpendicular to the axis of the roller 10, prevents the apparatus from being able to slip transversely to the axis of the vehicle wheel when the friction roller 10 is pressed against the wheel.

At the side of the housing 1, underneath the seat 13, there is also a reversing switch 26 which enables the motor 2 to be switched over from one direction of rotation to the other (clockwise/counterclockwise).

In the known devices, it could happen that the electromechanical transducer, which rested on the ground, was damaged in the event of a failure of the jack. According to the present invention, therefore, an electromechanical transducer, which works on the seismic principle, is proposed, such as is illustrated in FIG. 5. The electromechanical transducer is secured to an L-shaped bracket 30 the longer arm of which comprises teeth 31. A clamping member 32, which guides a set-screw 33, is displaceable on the teeth 31.

The electro-mechanical transducer itself consists of a cover 34 which is secured to the bracket 30 and to which a sleeve 35 is screwed or otherwise secured. The lower mouth of the sleeve 35 is closed by means of a further cover 36. The lower cover 36 has a concentric projection 37 which is provided with an external thread and which has a tapered aperture to receive a block 38 for the passage of a supply conductor 39.

In the sleeve 35 is a magnetic body 40 which is held spaced apart from the lower cover 36 by means of threaded bolts 41. Mounted in the free space below the magnetic body 40 is a coil form 42 which is secured to leaf springs 43. The coil form 42 is tank-like in shape and open at the top. At its upper outer periphery it carries a winding 44 which enters an annular aperture in the magnetic body 40.

The leaf springs 43 are so strong that the natural resonance of the electro-mechanical transducer is always higher than the speed of rotation of the vehicle in question. The natural resonance of the transducer is preferably above 50 cycles/sec.

The mode of operation of the device according to the invention is as follows:

A motor vehicle 50, of which the front wheel 51 for example is to be balanced or checked as regards its outof-balance, is jacked up by means of an ordinary jack. A mark 52, for example in the form of a chalk mark, is made on the vehicle wheel 51. The transducer illustrated in FIG. 5 is suspended by means of the clamp formed from the parts 30 to 33, from a suitable point of the suspension 53 for the vehicle wheel 51, the clamping member 32 being displaced on the teeth 31 until an appropriate jaw width is obtained and then the set-screw 33 is tightened.

The apparatus according to the present invention is now raised by means of the handle 24 and driven up to the vehicle in such a manner that the friction roller 10 which is accommodated in the front portion of the housing 1 lies with its curved surface a short distance from the tire of the vehicle wheel 51. The electric supply line 54 for the driving motor 2, which is taken out of the rear of the housing 1, is connected to a three-phase mains supply. The operator now takes up a position on the seat 13 with his legs on each side of the housing 1. The distance of the seat 13 from the friction roller 10 is selected in such a manner that the operator can easily reach the vehicle wheel 51 with his hand without leaving his seat 13. The operator now switches on the apparatus and swings the rocking lever 5 towards the right, pressing the friction roller 10 against the vehicle wheel 51. In this manner, the vehicle wheel is driven at a speed which preferably corresponds to a travelling speed of 130 kn./h. The out-of-balance oscillations picked up by the electro-mechanical transducer are transmitted through an amplifier which is not illustrated and through an oscillation filter, on the one hand to the amplitude-indicating instrument 17 and on the other hand to a pulse generator for the stroboscope lamp 21.

Figure 6:
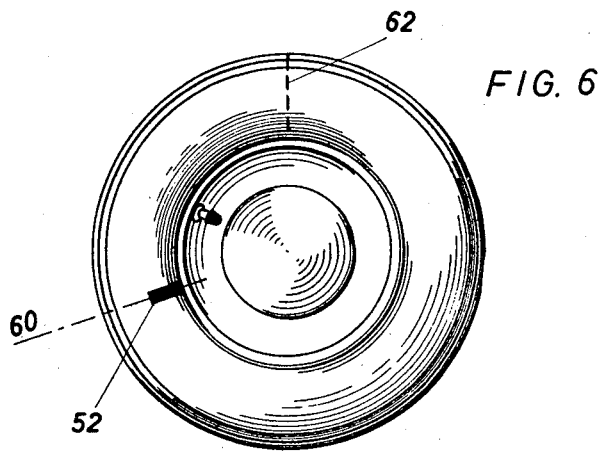
FIGS. 6 and 7 show views of the vehicle wheel to explain the method of the invention.
Figure 7:
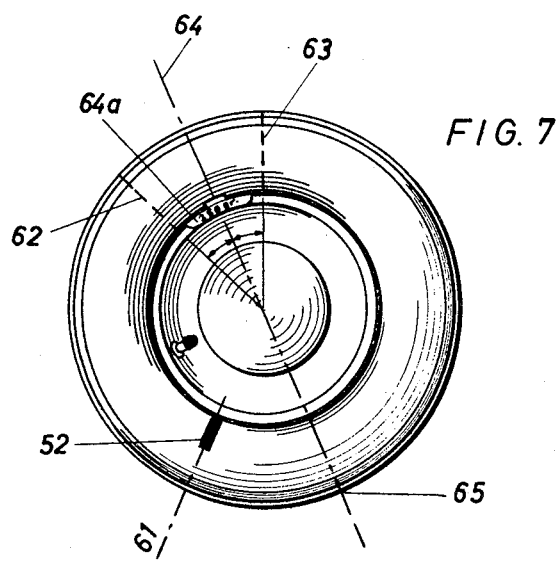

FIGS. 6 and 7 illustrate the method of finding the position of the out-of-balance. On each complete revolution of the vehicle wheel 51, the stroboscope lamp emits one flash of light so that the mark 52 appears to stand still, for example at the point 60. The operator notes this position and switches the motor off again. Then he actuates the reversing switch 26 and now drives the vehicle wheel 51 in the opposite direction at the same speed. The mark 52 will now appear to stop in another angular position, for example at the position 61 which is likewise noted by the operator. After switching off the apparatus, he swings the rocking lever 5 towards the left until it engages in the notch 7. Now he turns the vehicle wheel 51 by hand until the mark 52 is at the point 60 which it had in the first run. The tire is provided with a chalk mark 62 vertically above the center of the wheel. Then the vehicle wheel is turned so that the mark is at the point 61 indicated during the second run. A second chalk mark 63 is now made above the center of the wheel. The angle bisector 64 of the angle formed by the two chalk marks is the point where the balancing weight 64a has to be inserted. The out-of-balance is precisely diametrically opposite at 65. As a result of this method, the phase angle between the position of the out-of-balance and the maximum oscillation, which angle depends on the damping, no longer enters into the angle determination. The preferred mode of operation described is accordingly free of error provided that the apparatus is correctly calibrated for example empirically, as regards the angular relationship, that is to say that the stroboscope lamp is fired correctly, as regards phase, in the cycle of the out-of-balance oscillations picked up by the electro-mechanical transducer. The size of the balancing weight is known to the operator from the deflection of the amplitude-indicating instrument 17 which has been adapted to the appropriate type of vehicle wheel by an appropriate setting of the rotary knob 16. The operator can now carry out one or more test runs without having to leave his comfortable position on the seat 13.

It has been found in practice that the balancing of vehicle wheels directly on the vehicle can be considerably accelerated and improved with the apparatus according to the present invention.

I claim:
1. Apparatus for determining the imbalance of a wheel which is supported by the suspension system of a vehicle and is free to rotate, comprising a movable housing having a seat for the operator, an electric motor in driving connection with a friction roller adapted to be placed in contact with the wheel to rotate same, a stroboscope lamp fixed to the housing and able to illuminate the wheel when the apparatus is in position, an electromechanical transducer adapted to be supported by a member of the wheel suspension system for converting into an alternating current the mechanical vibrations arising on rotation of the wheel, an indicator instrument mounted on the housing and connected to the electromechanical transducer by means of a lead, the instrument being effective to measure the amplitude of the alternating current, control means connected to and designed to control the stroboscope lamp and being controlled by the alternating current of the electromechanical transducer so that the stroboscope lamp periodically flashes in phased relationship to the alternating current.

2. Apparatus according to claim 1, in which the stroboscope lamp is fixed to the side of the housing by means of an arm.

3. Apparatus according to claim 1, in which the stroboscope lamp is fixed by a jointed arm to the housing so that the lamp may be swung about the joint.

4. Apparatus according to claim 1, in which the electric motor is designed for rotation in both rotary directions, and in which a reversing switch is provided in the housing to control the rotary direction of the motor.

5. Apparatus according to claim 1, in which a hand-operated adjustment member is incorporated in the indicator instrument to alter its sensitivity, and in which the scale of the indicator is marked in weights, so that when the adjustment member has been adjusted to correspond with a specific vehicle-wheel-type the required balancing weight can be read directly from the scale of the indicator instrument.

6. Apparatus for determining the imbalance of a wheel in operative position on a vehicle, which is supported by the suspension system of a vehicle and is free to rotate, comprising a movable housing having a seat thereon for the operator, an electric motor in driving connection with a friction roller adapted to be placed in contact with the vehicle wheel to rotate same, a pivotal mounting for the motor and friction roller, a lever secured to the pivotal mounting, by means of which lever the motor and friction roller can be moved between a position in which the roller is enclosed by said housing and a position in which a portion of the roller projects externally of the housing for contacting the vehicle wheel, a stroboscope lamp fixed to the housing and able to illuminate the wheel when the apparatus is in position, an electromechanical transducer adapted to be supported by a member of the wheel suspension system for converting into an alternating current the mechanical vibrations arising on rotation of the wheel, an indicator instrument mounted on the housing and connected to the electromechanical transducer by means of a lead, the instrument being effective to measure the amplitude of the alternating current, control means connected to and designed to control the stroboscope lamp and being controlled by the alternating current of the electromechanical transducer so that the stroboscope lamp periodically flashes in phased relationship to the alternating current.

7. Apparatus as claimed in claim 6, in which the housing also includes a tool box, and in which the seat for the operator is hingedly attached to the housing and forms a lid for the tool box.

8. Apparatus for determining the imbalance of a wheel which is supported by the suspension system of a vehicle and is free to rotate comprising a movable housing having a seat for the operator, an electric motor in driving connection with a friction roller adapted to be placed in

I claim:

1. Apparatus for determining the imbalance of a wheel which is supported by the suspension system of a vehicle and is free to rotate comprising a movable housing having a seat for the operator, an electric motor in driving connection with a friction roller adapted to be placed in contact with the wheel to rotate same, a stroboscope lamp fixed to the housing and able to illuminate the wheel when the apparatus is in position, an electromechanical transducer secured to a clamp in the form of an L-shaped bracket, a clamping member being mounted on the bracket for displaceable movement therealong, the clamping member including a threaded screw by means of which a member of the suspension system can be clamped between the clamping member and the bracket, the transducer being effective to convert into an alternating current the mechanical vibrations arising on rotation of the wheel, an indicator instrument mounted on the housing and connected to the electromechanical transducer by means of a lead, the instrument being effective to measure the amplitude of the alternating current, a control means connected to and designed to control the stroboscope lamp and being controlled by the alternating current of the electromechanical transducer so that the stroboscope lamp periodically flashes in phased relationship to the alternating current.

2. Apparatus according to claim 1, in which the stroboscope lamp is fixed to the side of the housing by means of an arm.

3. Apparatus according to claim 1, in which the stroboscope lamp is fixed by a joined arm to the housing so that the lamp may be swung about the joint.

4. Apparatus according to claim 1, in which the electric motor is designed for rotation in both rotary directions, and in which a reversing switch is provided in the housing to control the rotary direction of the motor.

5. Apparatus according to claim 1, in which a hand-operated adjustment member is incorporated in the indicator instrument to alter its sensitivity, and in which the scale of the indicator is marked in weights, so that when the adjustment member has been adjusted to correspond with a specific vehicle-wheel-type the required balancing weight can be read directly from the scale of the latter instrument.

6. Apparatus for determining the imbalance of a wheel in operative position on a vehicle, which is supported by the suspension system of a vehicle and is free to rotate, comprising a movable wheel housing having a seat thereon for the operator, an electric means in driving connection with a friction roller adapted to be placed in contact with the vehicle wheel to rotate same, a pivotal mounting for the motor and friction roller, a lever secured to the pivotal mounting, by means of which lever the motor and friction roller can be moved to a position in which the roller can be lowered by said housing in which a position of the roller projects externally of the housing for contacting the vehicle wheel, a stroboscope lamp fixed to the housing and able to illuminate the wheel when the apparatus is in position, an electromechanical transducer adapted to be supported by a member of the wheel suspension system for converting into an alternating current the mechanical vibrations arising on rotation of the wheel, an indicator instrument mounted on the housing and connected to the electromechanical transducer by means of a lead, the instrument being effective to measure the amplitude of the alternating current, control means connected to and designed to control the stroboscope lamp and being controlled by the alternating current of the electromechanical transducer so that the stroboscope lamp periodically flashes in phased relationship to the alternating current.

7. Apparatus as claimed in claim 6, in which the housing also includes a tool box, and in which the seat for the operator is hingedly attached to the housing and forms a lid for the tool box.

8. Apparatus for determining the imbalance of a wheel which is supported by the suspension system of a vehicle and is free to rotate comprising a movable housing having a seat for the operator, an electric motor in connection with a friction roller adapted to be placed in References Cited in the file of this patent

UNITED STATES PATENTS

| | | |
|---|---|---|
| 2,050,073 | Thearle | Aug. 4, 1936 |
| 2,341,443 | Hunter | Feb. 8, 1944 |
| 2,383,405 | Merrill et al. | Aug. 21, 1945 |
| 2,565,577 | Schnoebelen | Aug. 28, 1951 |
| 2,604,558 | Hermann | July 22, 1952 |
| 2,700,892 | Lowe | Feb. 1, 1955 |
| 2,722,829 | Ringering | Nov. 8, 1955 |